US011276184B2

(12) United States Patent
Murienne et al.

(10) Patent No.: US 11,276,184 B2
(45) Date of Patent: Mar. 15, 2022

(54) METHOD AND DEVICE FOR DETERMINING THE AMPLITUDE OF A MOVEMENT PERFORMED BY A MEMBER OF AN ARTICULATED BODY

(71) Applicant: FONDATION B-COM, Cesson Sevigne (FR)

(72) Inventors: Albert Murienne, Rennes (FR); Laurent Launay, Nouvoitou (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

(21) Appl. No.: 16/913,437

(22) Filed: Jun. 26, 2020

(65) Prior Publication Data
US 2021/0004968 A1 Jan. 7, 2021

(30) Foreign Application Priority Data

Jul. 5, 2019 (FR) .................................. 19 07560

(51) Int. Cl.
*G06T 7/246* (2017.01)
*G06T 7/50* (2017.01)
(Continued)

(52) U.S. Cl.
CPC ............. *G06T 7/251* (2017.01); *G06N 20/00* (2019.01); *G06T 7/50* (2017.01); *G06T 7/75* (2017.01);
(Continued)

(58) Field of Classification Search
CPC ........... G06T 7/246; G06T 7/251; G06T 7/50; G06T 7/70; G06T 7/74; G06T 7/75;
(Continued)

(56) References Cited

U.S. PATENT DOCUMENTS

2015/0320343 A1* 11/2015 Utsunomiya ........ A61B 5/4824
600/595
2019/0066327 A1* 2/2019 Fujimoto .................. G06T 7/70
(Continued)

OTHER PUBLICATIONS

Joo H, Simon T, Sheikh Y. Total capture: A 3d deformation model fortracking faces, hands, and bodies. IEEE, 2018 (pp. 8320-8329). (Year: 2018).*

(Continued)

*Primary Examiner* — Diane M Wills
(74) *Attorney, Agent, or Firm* — Nixon & Vanderhye

(57) ABSTRACT

A method for determining the amplitude of a movement performed by a member of an articulated body comprises:
obtaining a segment representative of the positioning of the member in a given reference frame at the end of said movement,
generating a three-dimensional model of the member, positioned in said reference frame by means of the obtained segment,
obtaining a cloud of three-dimensional points representing the member in said reference frame at the end of said movement, based on depth information provided by a sensor, said depth information defining a three-dimensional scene comprising at least a part of the articulated body including said member,
repositioning the model of the member so as to minimize a predetermined error criterion between the obtained cloud of points and said model, and
determining the amplitude of the movement, based on the new positioning of the model of the member.

19 Claims, 5 Drawing Sheets

(51) Int. Cl.
  *G06T 7/73* (2017.01)
  *G06T 17/00* (2006.01)
  *G06T 19/20* (2011.01)
  *G06N 20/00* (2019.01)
(52) U.S. Cl.
  CPC .............. *G06T 17/00* (2013.01); *G06T 19/20* (2013.01); *G06T 2207/10028* (2013.01); *G06T 2207/30181* (2013.01); *G06T 2219/2004* (2013.01)
(58) Field of Classification Search
  CPC . G06T 17/00; G06T 19/20; G06T 2219/2004; G06T 2207/10028; G06T 2207/30196
  See application file for complete search history.

(56) References Cited

U.S. PATENT DOCUMENTS

| | | | | |
|---|---|---|---|---|
| 2019/0340773 | A1* | 11/2019 | Cao | G06F 3/017 |
| 2019/0355144 | A1* | 11/2019 | Korobov | G06T 7/11 |
| 2020/0098175 | A1* | 3/2020 | Chen | A63F 13/428 |
| 2021/0157329 | A1* | 5/2021 | Li | G06T 7/74 |

OTHER PUBLICATIONS

Knoop, Steffen, Stefan Vacek, and Rüdiger Dillmann. "Sensor fusion for 3D human body tracking with an articulated 3D body model ." Proceedings 2006 IEEE International Conference on Robotics and Automation, 2006. ICRA2006.. IEEE, 2006. (Year: 2006).*

Newell, Alejandro, Kaiyu Yang, and Jia Deng. "Stacked hourglass networks for human pose estimation." European conference on computer vision. Springer, Cham, 2016 (Year: 2016).*

French Search Report, FR 1907560, dated Dec. 12, 2019.

Jilliam Mar?a D?az Barros et al: "Real-time Human Pose Estimation from Body-scanned Point Clouds", Proceedings of the 10th International Conference on Computer Vision Theory and Applications, Jan. 1, 2015 (Jan. 1, 2015), pp. 553-560, XP055358213, DOI: 10.5220/0005309005530560 ISBN: 978-989-7580-91-8 * le document en entier.

Breedon Philip et al: "Enhancing the Measurement of Clinical Outcomes Using Microsoft Kinect", 2016 International Conference on Interactive Technologies and Games (ITAG), IEEE, Oct. 26, 2016 (Oct. 26, 2016), pp. 61-69, XP033023765, DOI: 10.1109/ITAG.2016.17 [extrait le Dec. 13, 2016] * le document en entier *.

Farnoosh Arefi et al: "Accurate body-part reconstruction from a single depth image", Multimedia Systems, ACM, New York, NY, US, vol. 1. 25, No. 3, Sep. 28, 2018 (Sep. 28, 2018), pp. 165-176, XP036788008, ISSN: 0942-4962, 001: 10.1007/S00530-018-0594-9 [extrait le Sep. 28, 2018] * Section 2 and 3. *.

Martinez et al., Simple yet Effective Baseline for 3D Human Pose Estimation,, University of British Columbia, Vancouver Canada, 2017.

Besl et al., "A Method for Registration of 3-D Shapes", IEEE Transactions on Pattern Analysis and Machine Intelligence, vol. 14, No. Feb. 2, 1992.

Newell et al., Stacked Hourglass Networks for Human Pose Estimation, University of Michigan, Ann Arbor, 2016.

Lee et al., "Measurement of Shoulder Range of Motion in Patients With Adhesive Capsulitis Using a Kinect"., DOI:10.1371/journal.pone.0129398 Jun. 24, 2015.

Fu et al., "Deep Ordinal Regression Network for Monocular Depth Estimation", Universite Paris-Est, LIGM (UMR 8049) CNRS, ENPC, ESIEE Paris UPEM, Marne-la-Vallee, France, 2018.

Constant et al., A Clinical Method of Functional Assessment of the Shoulder, 1987.

Projection in Realsense SKD 2.0, Intelrealsense, 2018.

Use Azure Kinect Calibratin Functins, Jun. 26, 2019.

Marin et al., 3D Human Pose Estimation From Depth Maps Using a Deep Combination of Poses, Jul. 17, 2018.

* cited by examiner

METHOD AND DEVICE FOR DETERMINING THE AMPLITUDE OF A MOVEMENT PERFORMED BY A MEMBER OF AN ARTICULATED BODY

TECHNICAL FIELD OF THE INVENTION

The present invention generally relates to the technical field of digital vision.

More particularly, it relates to a method and a device for determining the amplitude of a movement performed by a member of an articulated body.

STATE OF THE ART

Digital vision can be used to determine the amplitude of a movement performed by an articulated body, for example the body of a patient within the framework of medical rehabilitation.

For that purpose, an acquisition system generally takes a series of measurements in order to characterize the movement of the patient. The movement amplitude is then inferred from these measurements.

An example is proposed in the article of Seung Hak Lee, Chiyul Yoon, Sun Gun Chung, Hee Chan Kim, Youngbin Kwak, Hee-won Park, Keewon Kim: *Measurement of Shoulder Range of Motion in Patients with Adhesive Capsulitis Using a Kinect*, PLOS ONE|DOI:10.1371/journal.pone.0129398, Jun. 24, 2015.

This document compares measurements provided, on the one hand, via a goniometer conventionally used within this framework, and on the other hand, via a depth sensor of the Kinect™ type. If the measurement values provided by the depth sensor and the goniometer are close to each other, the degree of accuracy obtained remains insufficient, whatever the measurement tool used. Moreover, the depth sensor of the Kinect™ type, although being faster in acquiring measurements, lacks robustness from the moment that the patient's position is not in compliance with a predetermined representation, for example when the patient is positioned from the back instead of being face on.

DISCLOSURE OF THE INVENTION

According to an aspect of the invention, a method is proposed for determining the amplitude of a movement performed by a member of an articulated body, said method comprising:

obtaining a segment representative of the positioning of the member in a given reference frame at the end of said movement, generating a three-dimensional model of the member, positioned in said reference frame by means of the obtained segment, obtaining a cloud of three-dimensional points representing the member in said reference frame at the end of said movement, based on depth information provided by a sensor, said depth information defining a three-dimensional scene comprising at least a part of the articulated body including said member, repositioning the model of the member so as to minimize a predetermined error criterion between the obtained cloud of points and said model, and determining the amplitude of the movement, based on the new positioning of the model of the member.

The amplitude of a movement is thus determined with a great accuracy thanks to the use of a model repositioned to the volume representing the member.

For example, obtaining the segment representative of the member comprises estimating the skeleton of the articulated body, which is called skeletal estimation, said segment corresponding to a part of the estimated skeleton.

According to a first embodiment, obtaining the segment representative of the member may comprise:

obtaining a two-dimensional image representing at least a part of the articulated body including said member, estimating a two-dimensional skeleton of the articulated body, based on the two-dimensional image, and detecting two-dimensional points characterizing the member, by means of the estimated skeleton, said segment corresponding to the two-dimensional segment linking said points.

The skeletal estimation on a two-dimensional image is simple to implement. It is moreover inexpensive in calculation time and in required memory space.

According to a second embodiment, obtaining the segment representative of the member comprises:

estimating the three-dimensional skeleton of the articulated body based on the depth information (for example, the depth map coupled to an RGB-D image provided by an RGB-D camera or a depth map alone, provided by a depth sensor, or also depth information inferred from a color image provided by a camera), detecting three-dimensional points characterizing the member, by means of the estimated skeleton, said segment corresponding to the three-dimensional segment linking said points.

This embodiment allows improving the accuracy of the determined amplitude.

For example, the method may further comprise processing the two-dimensional image so as to place the representation of the articulated body in the center of the image.

This step has for advantage to facilitate obtaining a segment representative of the positioning of the member, in particular during a skeletal detection.

The method may further comprise, if the depth information is a depth map, processing the depth map so as to place the representation of the articulated body in the center of said depth map.

Preferably, the segment is further representative of at least one quantity characterizing said member, obtaining the segment further comprising comparing a value of said quantity with a range of predetermined values for said quantity, and if said value does not belong to said range of values, obtaining again a segment representative of said member, otherwise generating the model of the member as a function of said obtained segment.

This step has for advantage to eliminate any segment that is not consistent with possible dimensions for a human member, for example.

The method may further comprise, previously to the repositioning of said model, filtering the three-dimensional points of the obtained cloud of points, as a function of the obtained segment.

Using a filtered cloud of points has for advantage to improve the accuracy of the repositioning step.

For example, the segment may further be representative of at least one quantity characterizing said member, generating the model of the member further comprising a sizing of said model as a function of said quantity.

This step has for object to improve the realism of the model and hence the measurement of the amplitude of the movement.

Preferably, the method may further comprise post-processing the generated model of the member, so as to delete at least a part of the model, which is not-visible within the sensor view angle.

This step has for advantage to improve the rapidity of execution of the repositioning step.

According to another aspect of the invention, it is proposed a device for determining the amplitude of a movement performed by a member of an articulated body, said device comprising:

a unit for obtaining a segment representative of the positioning of the member in a given reference frame at the end of said movement, a unit for generating a three-dimensional model of the member, positioned in said reference frame by means of the obtained segment, a unit for obtaining a cloud of three-dimensional points representing the member in said reference frame at the end of said movement, based on a depth map provided by a sensor, said depth map representing a three-dimensional scene comprising at least a part of the articulated body including said member, a unit for repositioning the model of the member so as to minimize a predetermined error criterion between the obtained cloud of points and said model, and a unit for determining the amplitude of the movement, based on the new positioning of the model of the member.

According to a possible embodiment, the unit for obtaining the segment representative of the positioning of the member is configured to implement:

obtaining a two-dimensional image representing at least a part of the articulated body including said member, estimating a two-dimensional skeleton of the articulated body, based on the two-dimensional image, and detecting two-dimensional points characterizing the member, by means of the estimated skeleton, said segment corresponding to the two-dimensional segment linking said points.

The different units may, for example, be implemented in practice by means of a processor of the device, this processor being programmed (for example, by means of computer program instructions stored in a memory of the determination device) to respectively implement the steps of determining the amplitude of a movement performed by a member of an articulated body.

According to another aspect of the invention, it is proposed a system for determining the amplitude of a movement performed by a member of an articulated body, said system comprising:

a device as described hereinabove, and a sensor coupled to said device and adapted to provide the depth map.

Of course, the different features, variants and embodiments of the invention may be associated with each other according to various combinations, insofar as they are not mutually incompatible or exclusive.

DETAILED DESCRIPTION OF THE INVENTION

Moreover, various other possible features of the invention emerge from the appended description made with reference to the drawings that illustrate non-limitative embodiments of the invention, and wherein.

Figure 1:
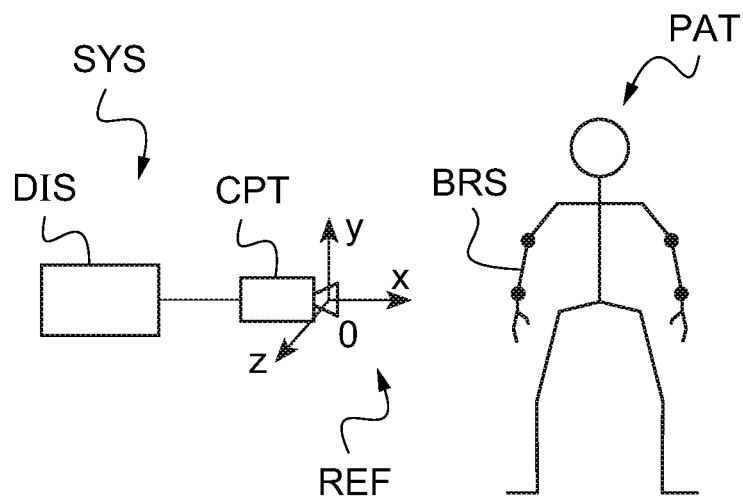
FIG. 1 shows a system for determining the amplitude of a movement performed by a subject in a particular case of application.

FIG. 1 shows a system SYS for determining the amplitude of a movement in the particular case of rehabilitation of a patient PAT. The rehabilitation comprises the analysis of the amplitude of the movement of a member of the patient, par example after an operation having led to a loss of mobility of the member in question. The invention is not limited to this type of application and may be used on any articulated body having a mobile member (human beings, animals, android, exoskeleton, the list being not exhaustive). According to the presently described embodiment, the patient PAT does not wear any marker serving to movement detection.

In this example, the system SYS will allow detecting the amplitude of a movement performed by a member BRS of the patient PAT, herein the arm. The amplitude is measured with respect to a reference, such as the vertical or the horizontal, or also another member to which it is coupled.

A three-dimensional scene, integrating at least the member BRS, is captured by a sensor CPT adapted to provide a depth map of the scene. For example, the depth sensor can be that which is incorporated within a so-called RGB-D camera, which provides, in addition to a color image, a corresponding depth map characterizing the distance of the objects of the scene with respect to the sensor CPT. For example, the sensor CPT can be of the Kinect™ type. Of course, the invention is not limited to these types of sensor.

The distance or depth is expressed in a given reference frame REF, for example a reference frame linked to the sensor CPT. In the embodiments described hereinafter, one of the axes of the reference frame of the sensor CPT is aligned with the horizontal axis for simplification purposes, without this choice is limitative. In the following of the description, unless otherwise specified, the steps will be performed by considering the reference frame linked to the sensor. The person skilled in the art will be able to transpose operations performed in another reference frame to the reference frame linked to the sensor.

The sensor CPT is coupled to a device DIS for determining the amplitude of a movement performed by the patient PAT. The whole forms the system SYS. The sensor CPT sends a depth map to the device DIS. An RGB-D camera can also provide a color image (for example, in the known format called RGB for "Red, Green, Blue") corresponding to the depth map.

Figure 2:
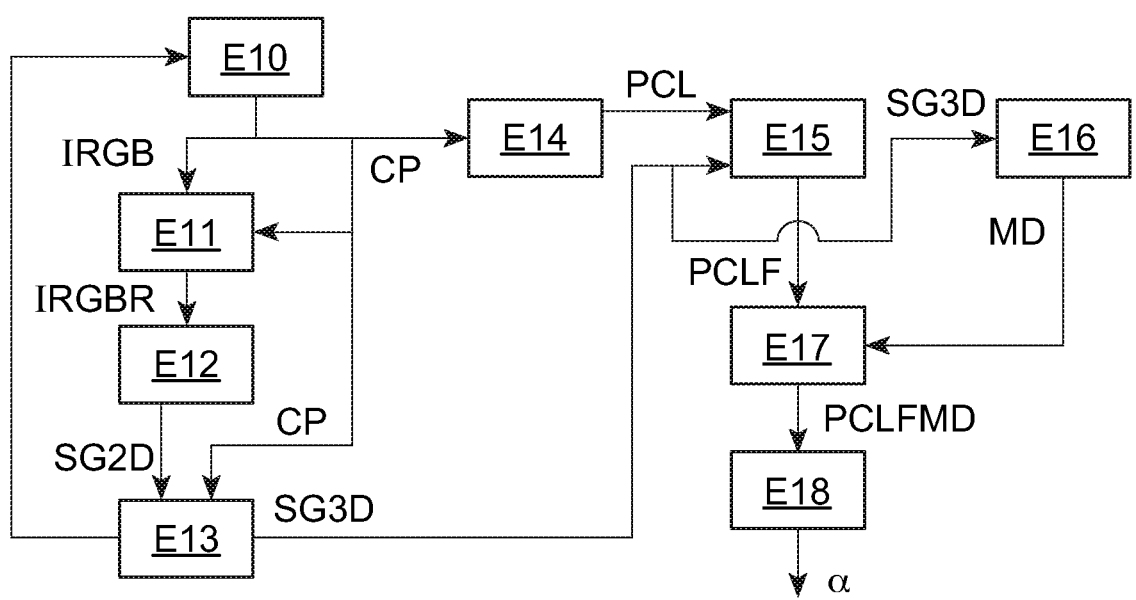
FIG. 2 illustrates a method for determining the amplitude of a movement performed, according to a first embodiment.

FIG. 2 illustrates a first embodiment of a method implemented by the device DIS. It is considered for this first embodiment that the sensor CPT supplies the device DIS with at least one piece of depth information, which is herein a depth map CP defining the scene, associated with a corresponding RGB image, each couple depth map/RGB image being captured at a given instant t.

A step E10 comprises capturing at least one depth map CP (i.e. a coordinate image based on the pixels) and a corresponding RGB image IRGB. Within the framework of the rehabilitation of a patient, the depth map CP and the image IRGB are captured at the moment when the patient has reached the maximum amplitude which it was able for him to reach, for the movement considered. It is considered in the following of the procedure that the image IRGB and the corresponding depth map CP are aligned with each other, i.e. expressed in the same reference frame. If not, a previous step of aligning the image IRGB with the depth map CP, known from the person skilled in the art, must be provided.

Preferably, this first embodiment comprises a step E11 of recentering the image IRGB to the considered subject. This step can further comprise deleting the zones of the image located around the subject in order to eliminate elements of the three-dimensional scene that could disturb the next steps. As a variant, the recentering can be performed by a skeleton estimation algorithm described hereinafter, at step E12.

Finally, this step E11 can also comprise putting the image IRGB into the square format. The recentering step E11 facilitates the operations performed in the following of the method, in particular step E12.

In order to position the considered subject in the center of the image IRGB, the depth map can be used in order to separate the patient from the background of the three-dimensional scene. The zone of the image IRGB corresponding to the subject isolated on the depth map CP is then obtained, for example through the programming interface of the RGB-D camera used. The image IRGB is then recentered to the subject. As a variant, the positioning of the subject in the center of the image IRGB can be performed based on the detection of a part of the subject and/or of a contour relating to the subject in the image IRGB, for example the face, and/or a box including the face ("bounding box").

Based on the recentered image IRGBR, step E12 allows obtaining a segment SG2D representative of its positioning, i.e. in this example, of its position and direction in the chosen reference frame. Preferably, the segment is also representative of at least one dimension of the member, for example its length.

The segment SG2D can be obtained by estimating the two-dimensional skeleton (or skeletal estimation) of the patient (or a part of the patient's body). This estimation comprises detecting the patient's articulations, which allows obtaining two-dimensional segments, representative of the members, a member being located between two articulations. For example, the skeletal estimation can be performed using an algorithm based on deep learning, for example the so-called "Stacked p Houglass" method described in the following article: "*Stacked Hourglass Networks for Human Pose Estimation*, Alejandro Newell, Kaiyu Yang and Jia Deng, 26 Jul. 2016".

The skeletal estimation on a two-dimensional image allows a robust detection of the patient's skeleton, which automatically and simply initializes the method.

As a variant, the segment SG2D representative of the member can be obtained, for example, by a tracing made on the image IRGBR by a user. As a variant, the segment can be obtained by providing the two-dimensional positions of the articulations located at the ends of the considered member. This variant, which is simpler to implement, is however less accurate.

Figure 3:
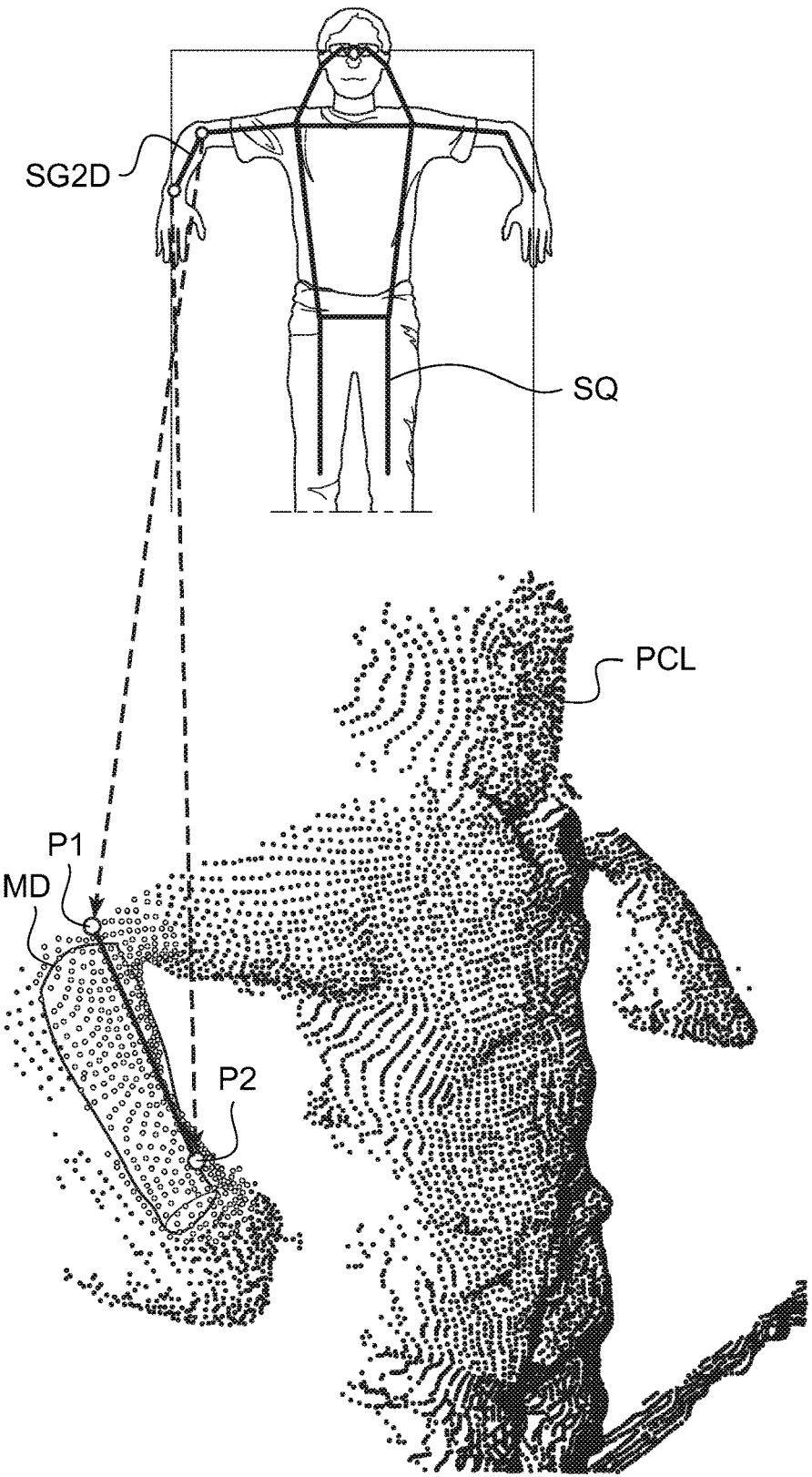
FIG. 3 illustrates steps of the method for determining the amplitude of a movement performed, according to the first embodiment.

By way of example, the upper part of FIG. 3 illustrates a skeleton SQ obtained from a skeletal model estimation method. The members of the patient's upper part are represented by a segment. The segment SG2D considered for this first embodiment corresponds to the right arm of the patient's skeleton SQ.

The method can comprise a step E13 for verifying the validity of the segment SG2D obtained. For example, if the considered member is an arm, step E13 can consist in comparing the segment length to a range of anatomically consistent values for an arm. If the length of the segment SG2D is out of this range of values, steps E10 to E12 are reiterated. Otherwise, the segment SG2D obtained is validated. A three-dimensional segment SG3D is then obtained from the segment SG2D and the depth map CP, making it possible, based on the two-dimensional coordinates of segment SG2D in the reference frame of the sensor, to obtain the corresponding three-dimensional coordinates. In other words, in this embodiment, the camera provides a 2D color image, and the depth sensor CPT associated with the camera provides the depth map CP. The 2D color image allows obtaining the 2D segment, for example by means of the skeletal model estimation method as explained hereinabove. The 2D coordinates of the 2D segment are hence expressed in the reference frame of the camera. The 3D depth values associated with these 2D coordinates, and hence the three-dimensional representation of the segment, can hence be obtained by means of the depth map CP. The latter may be expressed in another reference frame than that used for the color image, such as the reference frame REF linked to the depth sensor CPT. In this case, an alignment of the reference frames is implemented during the previous step mentioned hereinabove. The alignment of the camera reference frame with the sensor reference frame is performed by means of the extrinsic transform between the camera capturing the image and the depth sensor CPT, such transform being provided by any manufacturer. Reference may, for example, be made on this aspect to document "*Projection in RealSense SDK 2.0*", Intel™ RealSense™ SDK Wiki, GitHub or to document "*Use Azure Kinect calibration functions*", Use Sensor SDK, Azure Kinect™ DK documentation, Microsoft™ Docs.

According to another embodiment (not illustrated), it is possible to determine the depth values associated with the pixels of the RGB image used to obtain the 2D segment, by means of known learning methods, such as those described, for example, in the following article: "*Deep Ordinal Regression Network for Monocular Depth Estimation*" de Huan Fu, Mingming Gong, Chaohui Wang, Kayhan Batmanghelich, Dacheng Tao, June 2018. In this case, the chosen reference frame can be that which is linked to the RGB camera and in which are expressed the coordinates of the 2D segment. During a step E14, the coordinates of the depth map CP are converted into a cloud of three-dimensional points PCL, thanks to a projection from the sensor of the 2D camera towards the three-dimensional 3D space, on the basis of a "pinhole" camera model. Preferably, the cloud of points PCL is filtered at step E15, so as to delete the points having a low probability to belong to the considered member. For example, the filtering can be performed using the dimensions of the segment SG3D or also the three-dimensional positions of the points located at the ends of the segment SG3D.

These three-dimensional points P1 and P2 are illustrated in the lower part of FIG. 3. Herein, point P1 corresponds to the projection of the elbow articulation to the skin, and point P2 corresponds to the projection of the wrist articulation to the skin.

The points of the cloud of points whose position is too far from the three-dimensional segment obtained from the three-dimensional positions of the points P1 and P2 are removed from the cloud of points PCL. A filtered cloud of points PCLF is obtained. The use of a filtered cloud of points allows improving the accuracy of the next step E17.

A model MD in the form of a cloud of three-dimensional points of the considered member is obtained at step E16, in this particular case, from a pre-established database. This model MD can be post-processed by being, for example, resized using the length of the three-dimensional segment SG3D. This length corresponds to the length between the above-mentioned points P1 and P2.

It is considered in this example, for simplification purposes, that the model is rigid, i.e. non-deformable.

Using the segment SG3D to generate and resize the model results in that its axis corresponds precisely to the axis of the patient's member in the reference frame of the sensor.

Moreover, step E16 may further comprise deleting the parts of the model MD that are not visible from the sensor CPT. For example, if the point of view of the sensor CPT allows seeing the right side of the model MD, the apexes corresponding to the left side of the model MD are deleted.

In this chosen reference frame, the filtered cloud of points PCLF and the member model MD are superimposed as illustrated in FIG. 3. In this embodiment, in a first time (not illustrated), the position of the model MD is initialized to the position of the delimited segment P1,P2, at the surface of the arm of the cloud of points PCLF. The model will be progressively repositioned, as described below.

Step E17 comprises repositioning the model MD so as to minimize an error criterion between the positioning of the model MD and that of the representation of the member in the filtered cloud of points PCLF. The position of the model is initialized from the position of the segment defined by the points P1, P2, then progressively repositioned to the position minimizing a predetermined error.

For example, the method used for minimizing the error can be the so-called "Iterative Closest Point (ICP)" method, described in this article: "*A method for Registration of 3-D Shapes*, Paul J. Best and Neil D. McKay, IEEE TRANSACTIONS OF PATTERN ANALYSIS AND MACHINE INTELLIGENCE, VOL. 14, NO. 2, FEBRUARY 1992".

An object of the ICP algorithm is to iteratively minimize a distance between two clouds of points, herein the cloud of points PCLF and the model MD. Four main steps of the algorithm are:

a first step of associating the points by criteria linked to the closest neighbor;

estimating transformation parameters, for the associated points, using a mean quadratic cost function;

transforming the associated points using the estimated parameters; and iterating at least once the preceding steps, as long as a stopping criterion is not reached, herein an error threshold. The error to be minimized can be a mean distance of the order of the centimeter between the cloud PCLF and the model MD.

A new positioning of the arm model is hence obtained after this repositioning step.

Figure 4:
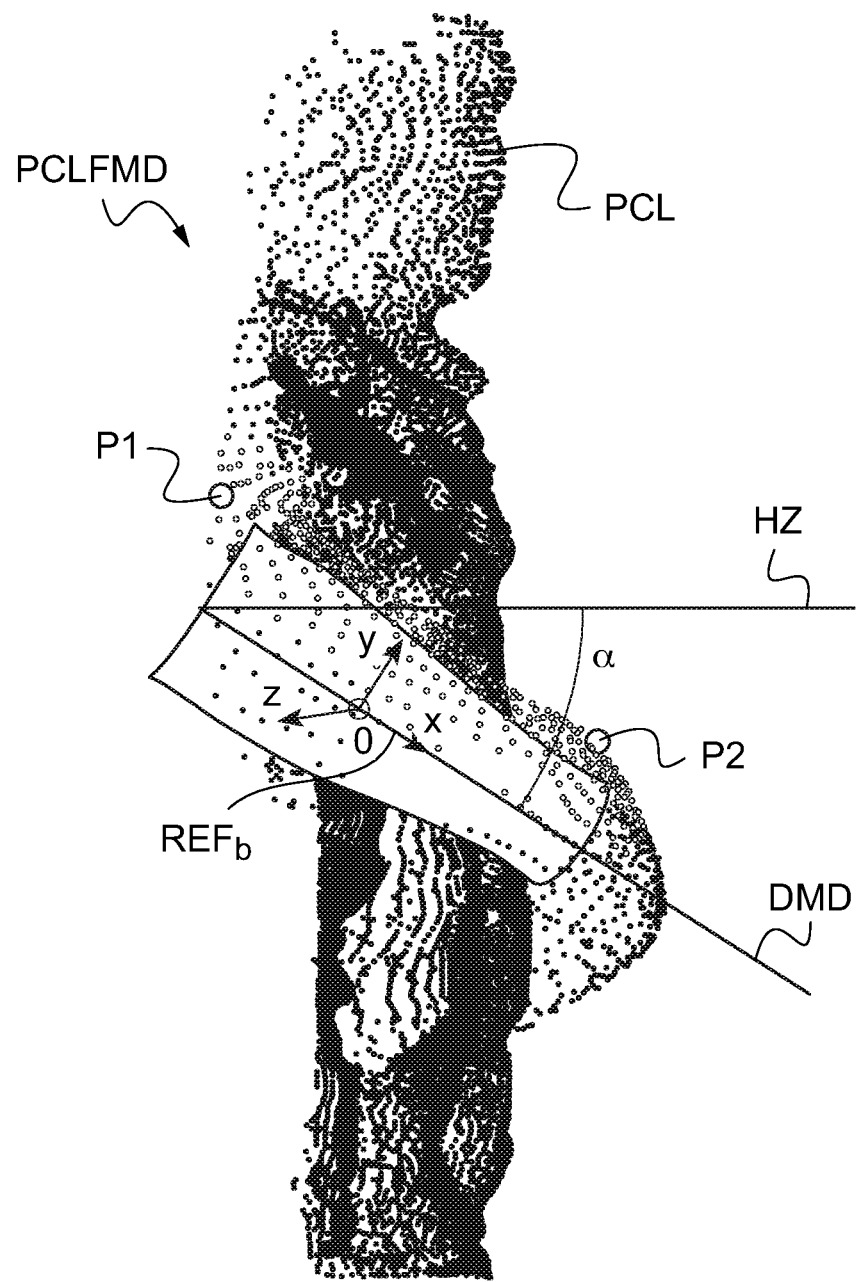
FIG. 4 illustrates the determination of an angle representative of the movement amplitude.

As a result of step E17, a three-dimensional image PCLFMD as shown in FIG. 4 is obtained. From this image is extracted, at step E18, a value representative of the movement amplitude, by simple reading or, preferably, automatically. Herein, the value is that of an angle $\alpha$ formed between the repositioned model symbolized by a straight line DMD passing through its central axis, and the horizontal line HZ. This angle $\alpha$, herein expressed in a reference frame linked to the arm $REf_b$, whose abscissa axis corresponds to the central axis of the arm, allows evaluating the arm movement amplitude with respect to the horizontal. Other measurements can be extracted to evaluate this amplitude, such as so-called anatomic measurements, related to targets to be reached, using for example the Constant score described in the following article: Constant C R, Murley A H, *A clinical method of functional assessment of the shoulder*, Clin Orthop Relat Res. 1987 January (214):160.

Determining the amplitude from the repositioned model allows obtaining a very accurate estimation of the amplitude, where the solutions of the prior art make errors of a few pixels that lead to offsets of several degrees in the estimation of the amplitude.

Figure 5:
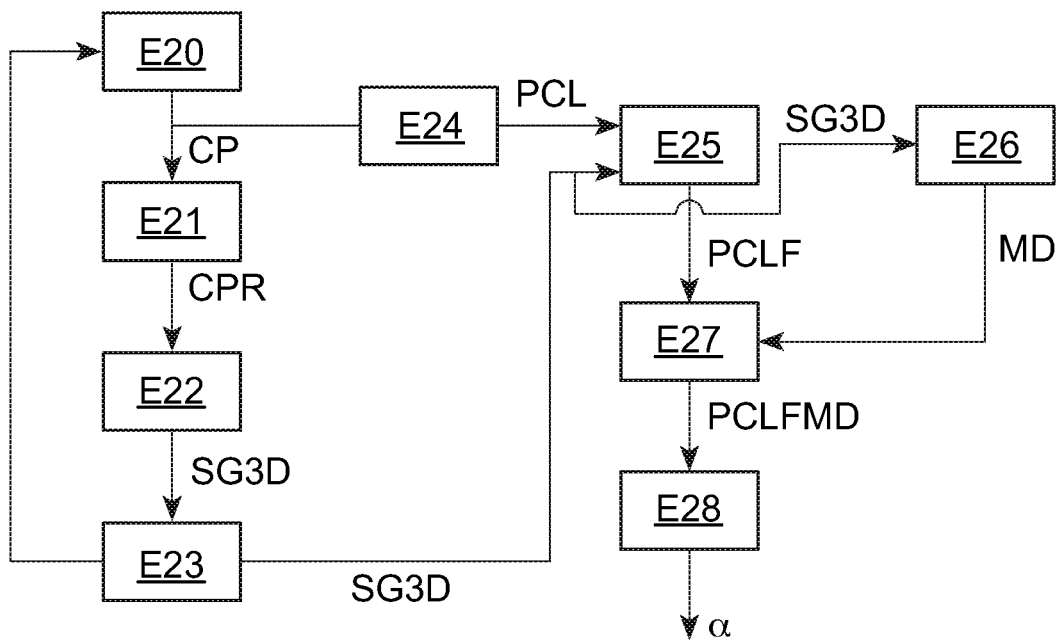
FIG. 5 illustrates a method for determining the amplitude of a movement performed, according to a second embodiment.

Reference will now be made to FIG. 5, which illustrates a second embodiment of the invention.

In a first step E20, depth information is provided. This depth information can be a depth map CP provided by a depth sensor. This depth map defines a three-dimensional scene including at least a part of the articulated body with the member having performed the movement whose amplitude is desired to be measured. As a variant, at step E20, an RGB-D camera can provide a color image simultaneously with a depth map.

Like for the image IRGB of the preceding embodiment, during step E21, when the depth information is a depth map CP, it can be recentered to the representation of the articulated body to improve the processing performed during the next steps.

As a variant, if the depth information is a depth map coupled with an RGB image (RGB-D camera), the method can then comprise a processing of the depth map and of the corresponding RGB image (E21) so as to place the representation of the articulated body in the center of said depth map and of the RGB image.

An estimation of the three-dimensional skeleton of the articulated body (or a part thereof) is performed at step E22 on the recentered depth map CPR, for example using the method described in "3*D human pose estimation from depth maps using a deep combination of poses*, Manuel J. Marin Jimenez, Francisco J. Romero-Ramirez, Rafael Munoz-Salinas, Rafael Medina-Carnicer", 2018 July.

According to another variant not shown, the depth information defining the three-dimensional scene can be inferred from a color image provided by a camera that then constitutes the sensor. The estimation of the three-dimensional skeleton can then be performed based on the inferred depth information, as described in: "*A simple yet effective baseline for 3d human pose estimation*, Julieta Martinez, Rayat Hossain, Javier Romero, James J. Little, 2017 August". Previously to this skeletal estimation, the color image used may be recentered to the considered subject PAT.

If the depth information is inferred from a color image provided by the sensor, the method can then comprise processing the color image (E21) so as to place the representation of the articulated body in the center of said color image.

The recentering steps can be performed as a previous processing, as illustrated in FIG. 5, or by the skeletal estimation algorithm used during step E22.

In the second embodiment, the three-dimensional positions of the articulations themselves are estimated, which allows directly obtaining a three-dimensional segment SG3D, representative of the members, a member being located between two articulations.

Figure 6:
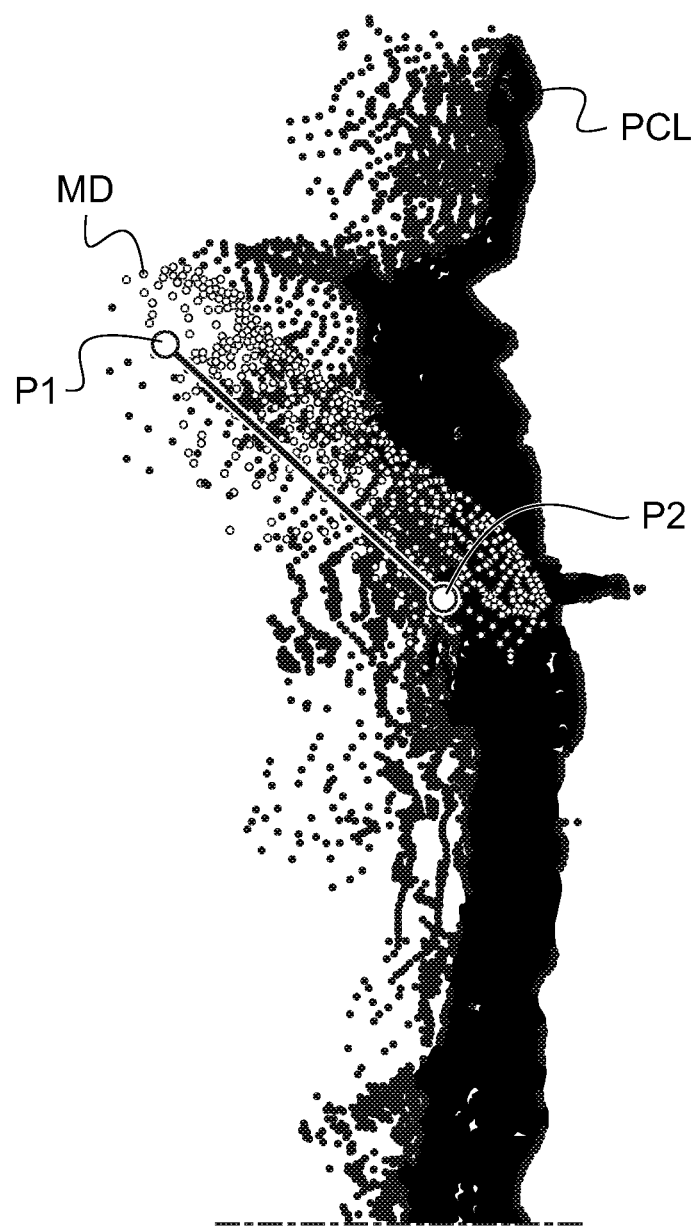
FIG. 6 illustrates steps of the method for determining the amplitude of a movement performed, according to the second embodiment.

The progress of steps E23 to E28 is similar to that of steps E13 to E18. However, as illustrated in FIG. 6, step E28 differs from step E18 in that the position of the model MD (white points) on the cloud of points PCLF is initialized on the segment passing through the points P1 and P2 that correspond, in this embodiment, to the position of the articulations, given that the skeletal estimation of step E22 has allowed obtaining a three-dimensional skeleton. The second embodiment hence allows having an accurate estimation of the amplitude, rapidly converging towards an optimum position, due to the position of the segment defined by P1, P2.

Figure 7:
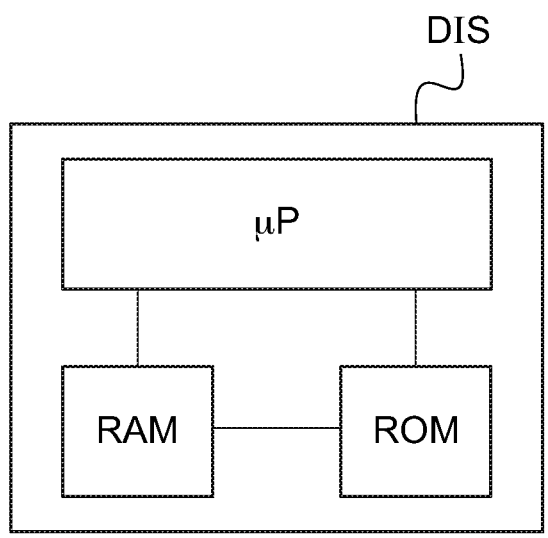
FIG. 7 shows a device for determining the amplitude of a movement performed by a subject according to a particular embodiment.

FIG. 7 illustrates a particular manner, among several possibilities, to make a device DIS configured to implement an embodiment of a method according to the invention. The device DIS comprises a random-access memory (for example, a RAM), a processing unit μP equipped, for example, with a processor and piloted by a computer program stored in a read-only memory (for example, a ROM or a hard drive). At the initialization, the code instructions of the computer program are, for example, loaded in the random-access memory RAM before being executed by the processor of the processing unit μP. In other words, the computer program executed by the processor, can comprise instructions for implementing an embodiment of a method for determining the amplitude of a movement, as described hereinabove.

FIG. 7 illustrates only a particular manner, among several possibilities, to make the device DIS in such a manner that it performs certain steps of the method according to the invention. Indeed, these steps may be performed indifferently on a reprogrammable calculation machine (a computer PC, a processor DSP or a micro-controller) executing a program comprising a sequence of instructions, or on a dedicated calculation machine (for example, a set of logical gates, such as an FPGA or an ASIC, or any other hardware module).

In the case where the processing means is made from a reprogrammable calculation machine, the corresponding program (i.e. the sequence of instructions) can be stored in storage medium, removable or not, this storage medium being partially or fully readable by a computer or a processor. In other words, a computer program comprising program code instructions for executing steps of an embodiment of an encoding or decoding method as described hereinabove, can be recorded on a recording support readable by a computer.

It is obvious that the just-described embodiments have been provided by way of purely indicative and not-limitative example, and that many modifications can be easily made by the person skilled in the art without thereby departing from the framework of the invention.

The invention claimed is:

1. A method for determining an amplitude of a movement performed by a member of an articulated body, said method comprising:
    obtaining a segment representative of a positioning of the member in a specific reference frame at an end of said movement;
    generating a three-dimensional model of the member, positioned in said specific reference frame using the obtained segment;
    obtaining a cloud of three-dimensional points representing the member in said specific reference frame at the end of said movement, based on depth information provided by a sensor, said depth information defining a three-dimensional scene comprising at least a part of the articulated body including said member;
    repositioning the three-dimensional model of the member to minimize a predetermined error criterion between the obtained cloud of three-dimensional points and said three-dimensional model, thereby obtaining a new positioning of the three-dimensional model of the member; and
    determining the amplitude of the movement, based on the new positioning of the three-dimensional model of the member.

2. The method according to claim 1, wherein obtaining the segment representative of the member comprises estimating a skeleton of the articulated body, said obtained segment corresponding to a part of the estimated skeleton.

3. The method according to claim 2, wherein obtaining the segment representative of the member comprises:
    obtaining a two-dimensional image representing at least a part of the articulated body including said member,
    estimating the skeleton that is a two-dimensional skeleton of the articulated body, based on the obtained two-dimensional image, and
    detecting two-dimensional points characterizing the member, using the estimated two-dimensional skeleton, said obtained segment corresponding to a two-dimensional segment linking said two-dimensional points.

4. The method according to claim 3, further comprising processing the two-dimensional image to place a representation of the articulated body in a center of the two-dimensional image.

5. The method according to claim 2, wherein obtaining the segment representative of the member comprises:
    estimating the skeleton that is a three-dimensional skeleton of the articulated body based on the depth information, and
    detecting three-dimensional points characterizing the member, using the estimated three-dimensional skeleton, said obtained segment corresponding to a three-dimensional segment linking said three-dimensional points.

6. The method according to claim 5, wherein the depth information is a depth map, and
    the method further comprises processing the depth map to place a representation of the articulated body in a center of said depth map.

7. The method according to claim 1, wherein the segment is further representative of at least one quantity characterizing said member, and
    the obtaining the segment comprises
        comparing a value of said at least one quantity with a range of predetermined values for said at least one quantity,
        in a case in which said value does not belong to said range of predetermined values, obtaining another segment representative of said member, and
        in a case in which the value does belong to the range of predetermined values, generating the three-dimensional model of the member as a function of said obtained segment.

8. The method according to claim 7, further comprising, before the repositioning of said three-dimensional model, filtering the three-dimensional points of the obtained cloud of points, as a function of the obtained segment.

9. The method according to claim 1, wherein the obtained segment is further representative of at least one quantity characterizing said member, the generating the three-dimensional model of the member further comprising sizing said three-dimensional model as a function of said quantity.

10. The method according to claim 1, further comprising post-processing the generated three-dimensional model of the member, so as to delete at least a part of the model, which is non-visible within the sensor view angle.

11. A device for determining an amplitude of a movement performed by a member of an articulated body, said device comprising:
at least one processor configured to:
obtain a segment representative of a positioning of the member in a specific reference frame at an end of said movement,
generate a three-dimensional model of the member, positioned in said specific reference frame using the obtained segment,
obtain a cloud of three-dimensional points representing the member in said specific reference frame at the end of said movement, based on depth information provided by a sensor, said depth information defining a three-dimensional scene comprising at least a part of the articulated body including said member,
reposition the three-dimensional model to minimize a predetermined error criterion between the obtained cloud of three-dimensional points and said three-dimensional model, thereby obtaining a new positioning of the three-dimensional model of the member, and
determine the amplitude of the movement, based on the new positioning three-dimensional model of the member.

12. The device according to claim 11, wherein the at least one processor is configured to:
obtain a two-dimensional image representing at least a part of the articulated body including said member,
estimate a two-dimensional skeleton of the articulated body, based on the obtained two-dimensional image, and
detect two-dimensional points characterizing the member, using the estimated two-dimensional skeleton, said obtained segment corresponding to a two-dimensional segment linking said two-dimensional points.

13. A system for determining an amplitude of a movement performed by a member of an articulated body, said system comprising:
the device according to claim 11; and
the sensor coupled to said device and configured to provide said depth information.

14. A method for determining an amplitude of a movement performed by a member of an articulated body, said method comprising:
obtaining a segment representative of a positioning of the member in a specific reference frame at an end of said movement;
generating a three-dimensional model of the member, positioned in said specific reference frame using the obtained segment;
obtaining a cloud of three-dimensional points representing the member in said reference frame at the end of said movement, based on depth information provided by a sensor, said depth information defining a three-dimensional scene comprising at least a part of the articulated body including said member;
repositioning the three-dimensional model of the member to minimize a predetermined error criterion between the obtained cloud of three-dimensional points and said three-dimensional model, thereby obtaining a new positioning of the three-dimensional model of the member; and
determining the amplitude of the movement, based on the new positioning of the three-dimensional model of the member,
wherein the obtaining the segment representative of the positioning of the member includes:
obtaining a two-dimensional image representing at least a part of the articulated body including said member,
estimating a two-dimensional skeleton of the articulated body, based on the obtained two-dimensional image, and
detecting two-dimensional points characterizing the member, using the estimated two-dimensional skeleton, said obtained segment corresponding to a two-dimensional segment linking said two-dimensional points.

15. The method according to claim 14, further comprising processing the two-dimensional image to place a representation of the articulated body in a center of the two-dimensional image.

16. The method according to claim 14, wherein the segment is further representative of at least one quantity characterizing said member, and
wherein the obtaining the segment representative of the positioning of the member further comprises:
comparing a value of said quantity with a range of predetermined values for said quantity,
in a case in which said value does not belong to said range of predetermined values, obtaining another segment representative of said member, and
in a case in which the value does belong to the range of predetermined values, generating the three-dimensional model of the member as a function of said obtained segment.

17. The method according to claim 14, further comprising, before the repositioning the three-dimensional model, filtering the three-dimensional points of the obtained cloud of points, as a function of the obtained segment.

18. The method according to claim 14, wherein the obtained segment is further representative of at least one quantity characterizing said member, the generating the three-dimensional model of the member further comprising sizing said three-dimensional model as a function of said quantity.

19. The method according to claim 14, further comprising post-processing the generated three-dimensional model of the member, to delete at least a part of the three-dimensional model, which is non-visible within the sensor view angle.

* * * * *